United States Patent
Takahashi et al.

(10) Patent No.: US 8,056,579 B2
(45) Date of Patent: Nov. 15, 2011

(54) MASS FLOW CONTROLLER

(75) Inventors: Akito Takahashi, Kyoto (JP); Yutaka Yoneda, Kyoto (JP)

(73) Assignee: Horiba Stec, Co., Ltd., Kyoto (JP)

( * ) Notice: Subject to any disclaimer, the term of this patent is extended or adjusted under 35 U.S.C. 154(b) by 942 days.

(21) Appl. No.: 11/757,887

(22) Filed: Jun. 4, 2007

(65) Prior Publication Data

US 2008/0295892 A1    Dec. 4, 2008

(51) Int. Cl.
*F16K 31/02* (2006.01)

(52) U.S. Cl. ..................... 137/487.5; 137/486

(58) Field of Classification Search ............... 137/487.5, 137/486

See application file for complete search history.

(56) References Cited

U.S. PATENT DOCUMENTS

| | | | | |
|---|---|---|---|---|
| 4,315,523 A * | 2/1982 | Mahawili et al. | | 137/486 |
| 4,658,855 A * | 4/1987 | Doyle | | 137/468 |
| 4,798,527 A * | 1/1989 | Gunda | | 425/145 |
| 6,467,469 B2 * | 10/2002 | Yang et al. | | 123/568.21 |
| 6,962,164 B2 * | 11/2005 | Lull et al. | | 137/2 |
| 7,231,931 B2 * | 6/2007 | Lull et al. | | 137/2 |
| 7,273,063 B2 * | 9/2007 | Lull et al. | | 137/12 |
| 7,380,564 B2 * | 6/2008 | Lull et al. | | 137/1 |
| 7,603,186 B2 * | 10/2009 | Smirnov | | 700/37 |

FOREIGN PATENT DOCUMENTS

| | | |
|---|---|---|
| JP | 59-223803 A | 12/1984 |
| JP | 61-109104 A | 5/1986 |
| JP | 02-259806 A | 10/1990 |
| JP | 06-035509 A | 2/1994 |
| JP | 06-236201 A | 8/1994 |
| JP | 2004-280689 A | 10/2004 |
| JP | 2004-302914 A | 10/2004 |

* cited by examiner

*Primary Examiner* — Stephen M Hepperle
*Assistant Examiner* — William McCalister
(74) *Attorney, Agent, or Firm* — Sughrue Mion, PLLC

(57) ABSTRACT

A mass flow controller has: a flow rate sensor section that measures the flow rate of a fluid and outputs a flow rate measurement signal indicating the measurement value; a flow rate control valve disposed upstream or downstream of the flow rate sensor section; a calculation section that calculates a feedback control value to be supplied to the flow rate control valve by performing at least a proportional calculation on the deviation of the flow rate measurement value indicated by the flow rate measurement signal from a flow rate setting value; and an opening control signal output section that generates an opening control signal based on the feedback control value and outputs the opening control signal to the flow rate control valve. The function used for calculating the gain value in the proportional calculation differs between a changing period and a stable period.

21 Claims, 6 Drawing Sheets

Fig. 6A
Pressure on primary side

Flow rate setting value is set to 10%FS

Pressure on primary side
(Change from 100 kPa to 113 kPa)

Fig. 6B
Flow rate indicative value

Flow rate indicative value according to prior art: 2%FS influence

Flow rate indicative value according to this embodiment: 0.1%FS influence 1 sec

Fig. 6C
Actual flow rate value

Actual flow rate value according to this embodiment

Actual flow rate value according to prior art

Time

MASS FLOW CONTROLLER

BACKGROUND OF THE INVENTION

1. Technical Field

Aspects of the present invention relate to a mass flow controller that controls the flow rate of a fluid, such as gas and liquid.

2. Related Art

In a related art semiconductor manufacturing apparatus to which various kinds of gas used for manufacturing a semiconductor are supplied, a mass flow controller is provided for each gas supply channel to adjust the flow rate of the gas. A related art pressure regulator is connected in series to each mass flow controller so as to prevent an extreme change in pressure in the channel to which the mass flow controller is attached, thereby facilitating flow rate control.

A related art flow rate control method for the mass flow controller is PID (proportional integral derivative) control. For example, a related art feedback control is based on a variation of the related art PID control disclosed in Japanese Laid-Open Patent Application No. 2004-280689 (hereafter "Patent Document 1"). According to the related art method disclosed in the Patent Document 1, the feedback control value is calculated by performing a PID calculation on the deviation, and multiplying the calculation result by a function whose value increases as the flow rate setting value decreases.

In a recent related art system, a regulator is provided only for a fluid supply source, such as a cylinder, rather than for each supply channel; however, the mass flow controller is provided for each supply channel.

This related art system configuration has at least the following disadvantage. If one of the supply channels is suddenly closed, or the flow rate of one of the mass flow controllers is substantially changed, the resulting pressure change affects the other supply channels or mass flow controllers (this is referred to as crosstalk). As a result the related art control method, which is based on the assumption that the pressure regulator controls the pressure change, may not be able to achieve adequate flow rate control.

More specifically, if the related art control method disclosed in the Patent Document 1 is used, and if the pressure on the primary side (the pressure on the upstream side of the mass flow controller) changes beyond a certain level, the flow rate excessively responds to the change and changes beyond a prescribed level.

As higher speed and precision are required in the related art control of the flow rate of the raw material gas or the like used in semiconductor processes, the speed of following the change of the flow rate setting value (the speed of response) cannot be sacrificed to suppress the above-described related art excessive response.

SUMMARY OF THE INVENTION

An aspect of the present invention provides a mass flow controller that can substantially prevent a flow rate change from occurring due to a pressure change without a substantial sacrifice in the speed of following the change of the flow rate setting value. The mass flow controller can be used in a system in which crosstalk can occur.

More specifically, a mass flow controller according to the exemplary embodiment comprises: a flow rate sensor section that measures the flow rate of a fluid flowing through a flow channel and outputs a flow rate measurement signal indicating the measurement value; a flow rate control valve that is disposed upstream or downstream of the flow rate sensor section; a calculation section that performs at least a proportional calculation on the deviation of the flow rate measurement value indicated by the flow rate measurement signal from a flow rate setting value, which is a target value, to calculate a feedback control value to be supplied to the flow rate control valve; and an opening control signal output section that generates an opening control signal based on the feedback control value and outputs the opening control signal to the flow rate control valve. In this mass flow controller, a value obtained by substituting the flow rate setting value into a function is used as a gain value by which the deviation is multiplied in the proportional calculation, and the function differs between a changing period, which is a period from a point in time when the flow rate setting value changes by an amount or more, and a stable period, which is the remaining period.

The mass flow controller thus configured switches the control between the stable period and the changing period. Therefore, in the changing period in which the flow rate setting value changes, the actual flow rate can be made to follow the changed flow rate setting value substantially quickly. In the stable period in which the flow rate setting value does not change significantly, the flow rate can be substantially prevented from excessively responding to any disturbance, such as a pressure change that occurs on the primary side (a pressure change that occurs on the upstream side of the mass flow controller), thereby stabilizing the actual flow rate.

The changing period may be constant or adjustable in order to improve the control stability, as required. For example but not by way of limitation, the changing period may be terminated when the deviation of the flow rate measurement value from the flow rate setting value changes to fall within a range.

The function used in each period may be fixed or viable. For example but not by way of limitation, if the function used in the changing period varies gradually (the term "gradually" herein may mean "stepwise" or "continuously", but is not limited thereto) to gradually change the control factor (gain value) so that the functions used in the changing period and the stable period are substantially the same as each other at the time of switching from the changing period to the stable period, the control factor varies smoothly, so that the flow rate control can be prevented from being unstable due to the change of the control factor at the time of switching from the changing period to the stable period.

According to an implementation that achieves both a high speed of response in the changing period and a high stability in the stable period, a function that returns a greater value as the flow rate setting value substituted thereto decreases may be used in the changing period, and a function that returns a smaller value as the flow rate setting value substituted thereto decreases may be used in the stable period.

In the related art, the flow rate indicative value output from the mass flow controller for external use may indicate a value substantially different from the flow rate measured on the downstream side (or the upstream side) because of an interference with the control of the flow rate control valve that is sensitive to a pressure change on the primary side.

To alter the opening control operation or procedure for the flow rate control valve described above, stabilize the flow rate indicative value and bring the flow rate indicative value close to the actual flow rate value, a flow rate output section can be provided that performs a calculation on the flow rate measurement value and outputs the result as the flow rate indicative value, and the flow rate output section can be configured to use different calculation formulas on the flow rate measurement value in the changing period and the stable period.

More specifically, in the stable period, the flow rate measurement value may be smoothed with respect to time, and the result is output and in the changing period, the flow rate measurement value may be output without being processed.

Since the control is switched between the stable period and the changing period, the mass flow controller can suppress a flow rate change without sacrificing the speed of following the change of the flow rate setting value even if a disturbance, such as a pressure change, occurs and can be used in a system in which a crosstalk may occur.

BRIEF DESCRIPTION OF THE DRAWINGS

FIGS. 6A-6C illustrate a graph showing a result of effect check and test, according to the exemplary embodiment.

DETAILED DESCRIPTION THE EXEMPLARY EMBODIMENTS

In the following, an exemplary, non-limiting embodiment of the present invention will be described with reference to the drawings.

Figure 1:
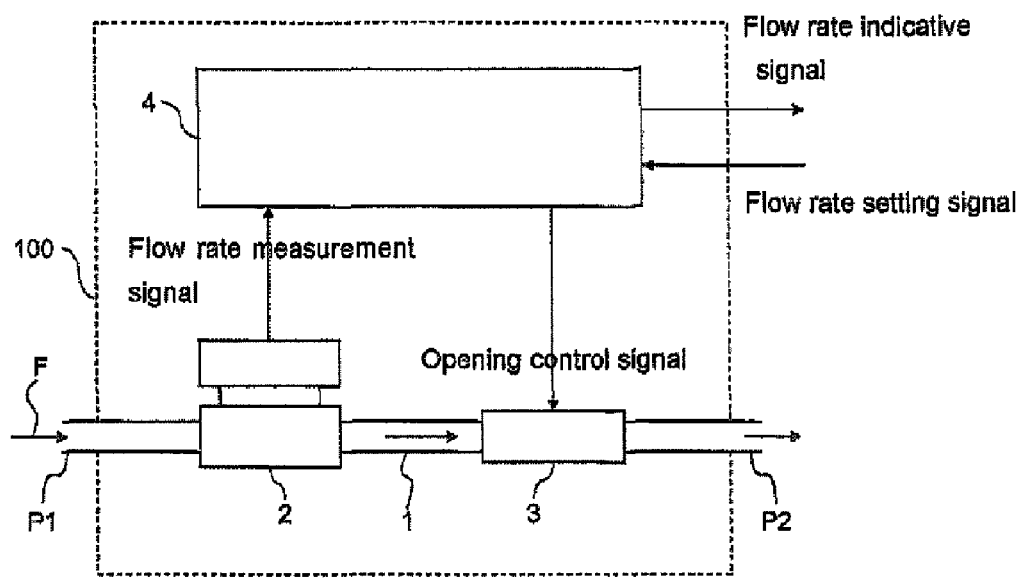
FIG. 1 is a schematic diagram showing a mass flow controller according to an exemplary embodiment.
Figure 2:
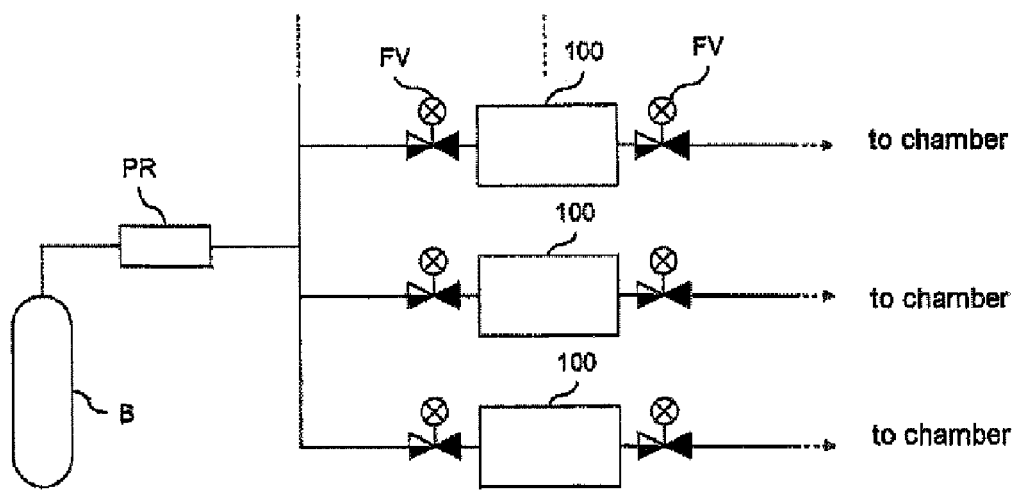
FIG. 2 is a diagram showing a configuration of a flow rate control system incorporating the mass flow controller according to the exemplary embodiment.

As shown in the schematic diagram of FIG. 1, a mass flow controller 100 according to the exemplary embodiment comprises an internal channel 1, a flow rate sensor section 2 that measures the flow rate of a fluid F flowing through the internal channel 1, a flow rate control valve 3 disposed downstream of the flow rate sensor section 2, and a control section 4. The mass flow controller 100 may be used in a gas supply system that supplies gas to a chamber in a semiconductor process as shown in FIG. 2.

The internal channel 1 has an inlet port P1 on the upstream side and an outlet port P2 on the downstream side. For example, the inlet port P1 may be connected to a fluid supply source B, such as a cylinder, via an external pipe, and the outlet port 2 is connected to a chamber for semiconductor manufacture (not shown) via an external pipe. In this exemplar embodiment, as shown in FIG. 2, a pipe connected to one fluid supply source B is branched, and each of the branch pipes is provided with one mass flow controller 100. Furthermore, a pressure regulator PR is provided only at the outlet of the fluid supply source B, and no pressure regulator for the mass flow controller 100 is provided for each pipe. Accordingly, no pressure measurement is made in the mass flow controller 100. Reference character FV denotes an air pressure valve. The flow rate sensor section 2 includes a pair of heat-sensitive sensors (thermal sensors) disposed in the internal channel 1. The thermal sensors measure the instantaneous flow rate of the fluid F as an electric signal, perform amplification or the like of the electric signal by an internal electric circuit, and output a flow rate measurement signal having a value that depends on the measured flow rate.

The flow rate control valve 3 can change the opening by means of an actuator constituted by a piezoelectric element (not shown). The flow rate control valve 3 drives the actuator in response to an opening control signal, which is an electric signal supplied externally, and adjusts the opening in accordance with the value of the opening control signal, thereby controlling the flow rate of the fluid F.

The control section 4 is composed of a digital or analog electric circuit comprising a central processing unit (CPU), a memory, an A/D converter, a D/A converter and the like. The control section 4 may be a dedicated one or partially or wholly composed of a general-purpose computer, such as a personal computer. Furthermore, the CPU may be omitted, and the functions of the remaining parts may be implemented only by an analog circuit. Furthermore, the control section 4 may not be a physically integral unit but may be composed of a plurality of devices interconnected by wire or wirelessly.

Figure 3:
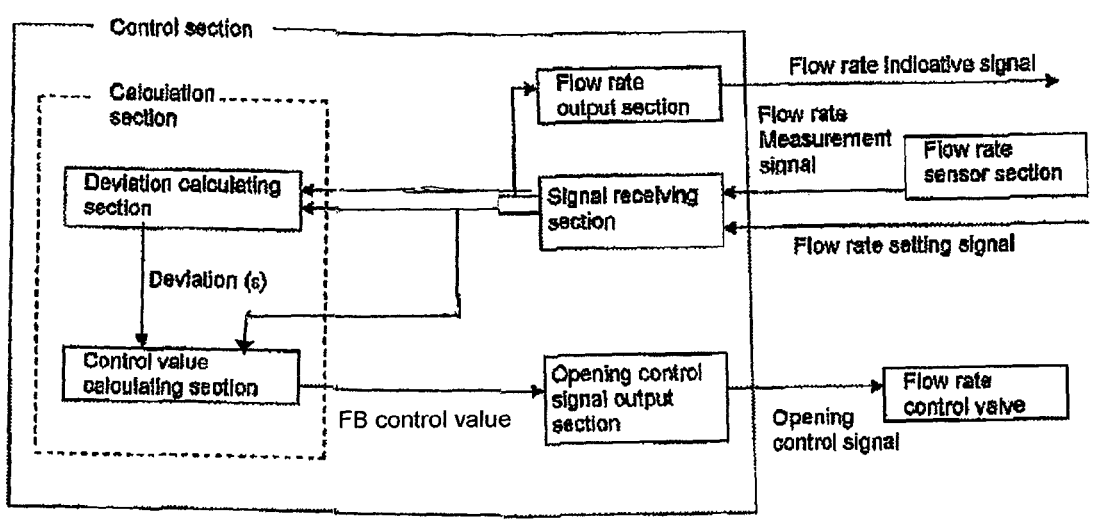
FIG. 3 is a functional block diagram of a control section according to the exemplary embodiment.

A set of instructions (i.e., program) is stored in the memory, and the CPU and a peripheral device thereof are operated in cooperation with each other in accordance with the instructions. As shown in FIG. 3, the control section 4 performs at least the functions of a signal receiving section 5, a calculation section 6, an opening control signal output section 7 and a flow rate output section 8.

The signal receiving section 5 receives the flow rate measurement signal sent from the flow rate sensor section 2, a flow rate setting signal input from another computer or the like, and stores the values of the signals in the memory.

The calculation section 6 has a deviation calculating section 61 that obtains the flow rate measurement value represented by the flow rate measurement signal and calculates the deviation of the flow rate measurement value with respect to a target value, that is, the flow rate setting value represented by the flow rate setting signal, and a control value calculating section 62 that calculates a feedback control value to be sent to the flow rate control valve 3 by performing at least a proportional calculation on the deviation.

The opening control signal output section 7 generates an opening control signal having a value depending on the feedback control value and outputs the opening control signal to the flow rate control valve 3.

The flow rate output section 8 calculates a flow rate indicative value by performing a calculation on the flow rate measurement value and outputs a flow rate indicative signal (analog or digital signal) representing the flow rate indicative value for the purpose of external use.

According to this exemplary embodiment, the control value calculating section 62 uses the value obtained by substituting the flow rate setting value into a function as a gain value by which the deviation is to be multiplied in the proportional calculation. The function differs between the changing period, which is a period from a point in time when the flow rate setting value changes by at least an amount, and the remaining, stable period. The changing period has a determined length of time, and starts when the flow rate setting value changes by at least an amount over a time period. This amount of change includes a percentage of the change with respect to the total value, and the value of the change ranges from about 0% to about 10%, and for example, from about 0.3% to about 5%. The time length of the changing period is determined to be from about 0 seconds to about 10 seconds, and more specifically, from about 0.3 seconds to about 5 seconds.

The function used for the changing period (referred to also as "first function" in the following for the purpose of differentiation) is a function that returns a greater value as the flow rate setting value to be substituted decreases. In this exemplary embodiment the function is expressed by the following formula (1), for example.

$$f_1(S)=(100+K_1)/(K_1+S) \quad (1)$$

In formula (1), reference character S denotes the flow rate setting value (in percentage with respect to full scale), and reference character $K_1$ denotes an adjustment factor.

The function used for the stable period (referred to also as second function in the following for the purpose of differentiation) is a function that returns a smaller value as the flow rate setting value to be substituted decreases. In this exemplary embodiment the function is expressed by the following formula (2), for example.

$$f_2(S)=S \cdot K_2+D \quad (2)$$

In formula (2), reference character $K_2$ denotes an adjustment factor, and reference character D denotes an offset constant.

Furthermore, in this exemplary embodiment the flow rate output section 8 determines the flow rate indicative value by performing different calculations on the flow rate measurement value between the changing period and the stable period, and outputs the respective flow rate indicative signals to the outside. In the stable period, the flow rate output section 8 outputs the flow rate indicative value that is determined by smoothing the flow rate measurement value with respect to time. In the changing period, the flow rate output section 8 outputs the flow rate measurement value as the flow rate indicative value without processing.

For smoothing with respect to time, the following formula (3) is used.

$$\text{OUT}=(\text{OUT}-\text{OUT\_OLD})) \cdot Z+\text{OUT\_OLD} \quad (3)$$

In formula (3), reference character Z denotes an adjustment factor, reference character OUT on the left-hand side denotes the latest flow rate indicative value newly calculated, reference character OUT on the right-hand side denotes the latest flow rate measurement value sampled, and reference character OUT_OLD denotes the previously calculated flow rate indicative value.

Figure 4:
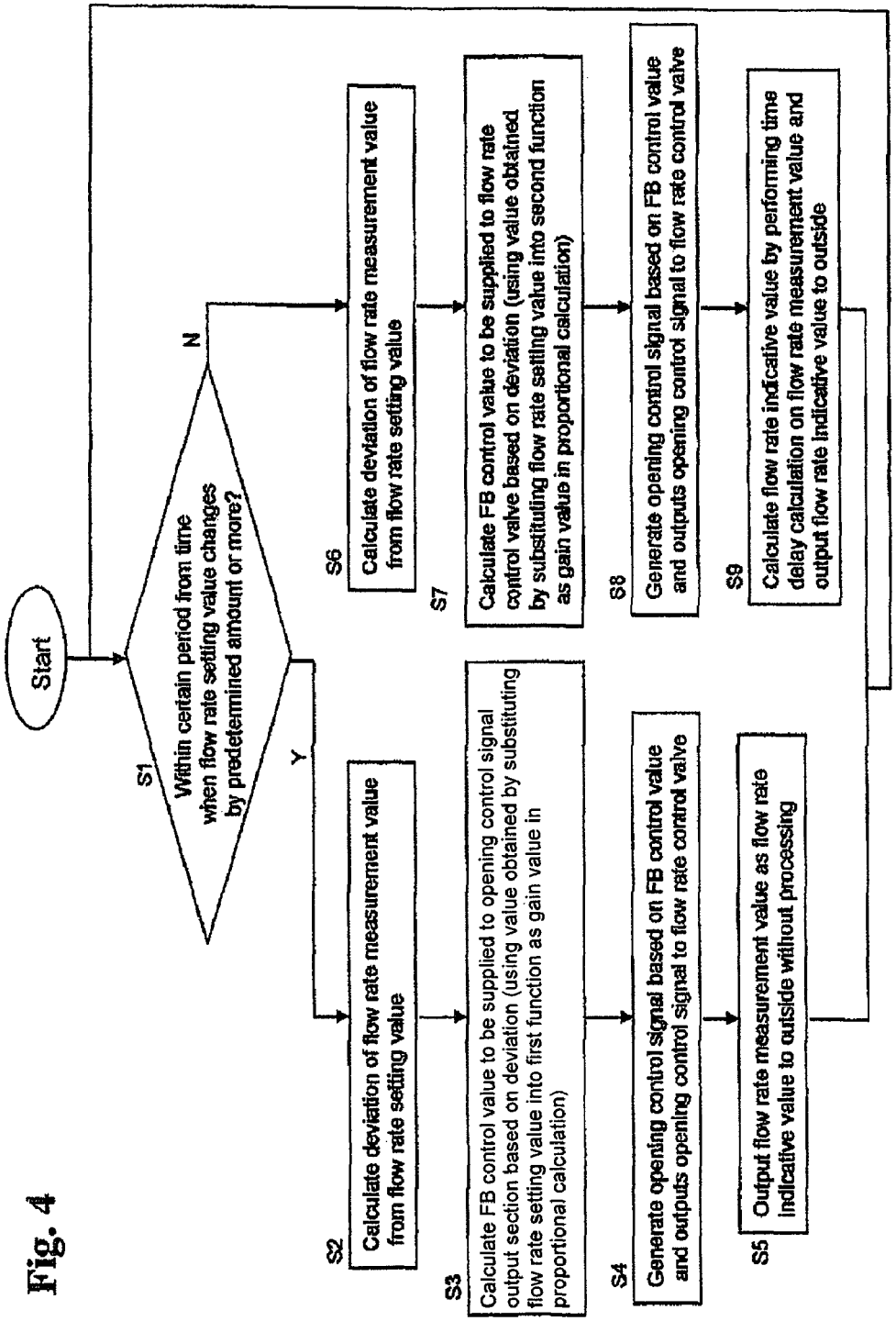
FIG. 4 is a control flow chart according to the exemplary embodiment.

An operation of the mass flow controller 100 will be described with reference to the flowchart of FIG. 4, focused primarily on the operation of the control section 4. This operation may be performed in a computer-readable medium configured to perform a series of instructions, such as software. Alternatively, the operation may be performed in hardware, or in a hybrid software-hardware combination.

The signal receiving section 5 receives the flow rate measurement signal constantly output from the flow channel sensor section 2 and the flow rate setting signal output from dedicated input means or another computer and samples the signals (operation S1).

If the flow rate setting value changes by at least an amount, a period (for example, about 2 seconds) from the point in time of the change is determined as a changing period, and the process proceeds to operation S2. The remaining period is determined as the stable period, and the process proceeds to operation S6.

In the case of the changing period, the deviation calculating section 61 calculates the difference between the value of the flow rate measurement signal received at the signal receiving section 5 (the flow rate measurement value) and the flow rate setting value, which is the value of the flow rate setting signal, or in other words, the deviation E (operation S2).

Then, the control value calculating section 62 calculates the feedback control value to be supplied to the flow rate control valve 3 by performing the PID calculation on the deviation (operation S3). In this operation, a value obtained by substituting the flow rate setting value into the first function is used as the gain value by which the deviation e is to be multiplied in the proportional calculation.

Then, the opening control signal output section 7 generates the opening control signal based on the feedback control value and outputs the opening control signal to the flow rate control valve 3 to change the opening of the flow rate control valve 3, thereby adjusting the flow rate (operation S4).

In addition, the flow rate output section 9 outputs the flow rate measurement value as the flow rate indicative value to the outside without processing (operation S5).

On the other hand, in the case of the stable period, as in operation S2, the deviation calculating section 61 calculates the difference between the value of the flow rate measurement signal received at the signal receiving section 5 (the flow rate measurement value) and the flow rate setting value, which is the value of the flow rate setting signal, or in other words, the deviation a (operation S6).

Then, the control value calculating section 62 calculates the feedback control value to be supplied to the flow rate control valve 3 by performing the PID calculation on the deviation $\epsilon$ (operation S7). In this operation, a value obtained by substituting the flow rate setting value into the second function is used as the gain value by which the deviation $\epsilon$ is multiplied in the proportional calculation.

Once the feedback control value is thus calculated, as in operation S4, the opening control signal output section 7 generates the opening control signal based on the feedback control value and outputs the opening control signal to the flow rate control valve 3 to change the opening of the flow rate control valve 3, thereby adjusting the flow rate (operation S8).

In addition, the flow rate output section 8 performs the calculation expressed by the formula (3) on the flow rate measurement value to determine the flow rate indicative value and outputs the flow rate indicative signal having the flow rate indicative value to the outside (operation S9).

As described above, the mass flow controller 100 performs the control process in different ways between the stable period and the changing period. Thus, in the changing period in which the flow rate setting value changes, the actual flow rate can substantially quickly follow the changed flow rate setting value, and in the stable period in which the flow rate setting value does not change significantly, even if a disturbance, such as a pressure change on the primary side (i.e., a pressure change on the upstream side of the mass flow controller 100), occurs, an excessive response thereto can be suppressed to stabilize the actual flow rate.

Furthermore, in the stable period, the flow rate measurement value smoothed with respect to time is used as the value of the flow rate indicative signal to be output to the outside (the flow rate indicative value). Therefore, the flow rate indicative value can be stabilized and brought substantially close to the actual flow rate value without excessively responding to a change of the pressure on the primary side or the like.

Figure 5:
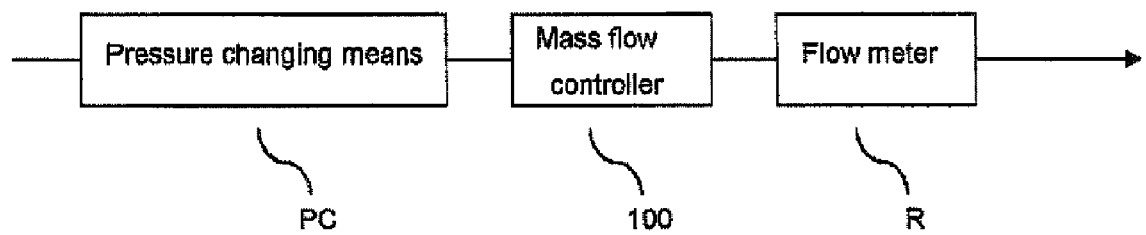
FIG. 5 is a schematic diagram showing the whole of an effect checking and testing system for the mass flow controller according to the exemplary embodiment.

FIG. 6 shows a specific effect, and FIG. 5 schematically shows an effect checking and testing system. In FIG. 5, reference character PC denotes pressure changing means (or pressure changing unit) that changes the pressure (primary pressure) applied to the mass flow controller 100, and reference character R denotes a flow meter that is disposed downstream of the mass flow controller 100 to measure the actual flow rate.

For the purpose of comparison, FIGS. 6A-6C shows an exemplary result of flow rate control in the stable period by a conventional mass flow controller that controls the flow rate using only the first function and outputs the flow rate measurement value as the flow rate indicative value without processing.

According to the related art if the pressure on the primary side changes, the value of the actual flow rate measured with another flow meter R greatly fluctuates. To the contrary, in the case of the mass flow controller 100 according to this exemplary embodiment the actual flow rate is maintained substantially constant (see FIG. 6C).

In addition, according to the related art, if the pressure on the primary side changes, the flow rate indicative value varies in the opposite direction to the actual flow rate value because of interference with the unstable operation of the control valve, and an erroneous flow rate indicative value is output. To the contrary, in the case of the mass flow controller 100 according to this exemplary embodiment, the flow rate indicative value varies in substantially the same direction as the actual flow rate value, and a flow rate indicative value extremely close to the actual flow rate value is output (see FIG. 6B).

It is to be noted that the present invention is not limited to the exemplary embodiment described above and other variations as would be understood by those skilled in the art may be substituted therefore or appended thereto without departing from the scope of the invention.

For example but not by way of limitation, the changing period may not be substantially constant and the changing period may be terminated using trigger means other than a timer structure. For example, the changing period may be terminated when the deviation of the flow rate measurement value from the flow rate setting value decreases to fall within a range.

Furthermore, the function used for each period may be a fixed one or a variable one as in the exemplary embodiment.

For example but not by way of limitation, the function used for the changing period (the first function) may be a function that varies gradually (stepwise or continuously) with time. In this case, if the values of the first and second functions at the time of switching from the changing period to the stable period, that is, the control factors (gain values) thereof at the time of switching from the changing period to the stable period, are made substantially equal, the flow rate control can be substantially prevented from being unstable due to the change of the control factor at the time of switching from the changing period to the stable period Furthermore, the control valve may be provided upstream of the flow rate sensor section 2. The flow rate sensor section 2 is not limited to the thermal sensor described above and may be other flow rate measuring systems, such as a differential sensor.

Various modifications can be made to the exemplary embodiment without departing from the spirit of the present invention.

The present invention provides a mass flow controller that can substantially prevent a flow rate change from being occurring due to a disturbance, such as a pressure change, without sacrificing the speed of following the change of the flow rate setting value and can be used in a system in which crosstalk can occur.

What is claimed is:

1. A mass flow controller, comprising:
a flow rate sensor section that measures a flow rate of a fluid flowing through a flow channel and outputs a flow rate measurement signal indicating a flow rate measurement value;
a flow rate control valve disposed one of upstream and downstream of the flow rate sensor section;
a calculation means for performing at least a proportional calculation on a deviation of the flow rate measurement value from a target flow rate setting value, to calculate a feedback control value to be supplied to an opening control signal output section; and
the opening control signal output section configured to generate an opening control signal based on said feedback control value, and outputs the opening control signal to the flow rate control valve,
the calculation means uses a gain value obtained by substituting said flow rate setting value into a function, and multiplies said gain value by the deviation in said proportional calculation,
said function differs between a changing period that comprises a period from a point in time when said flow rate setting value changes by at least an amount, and a stable period that comprises a period other than the changing period;
the function in said changing period returns a greater value as the flow rate setting value decreases, and
the function in said stable period returns a smaller value as the flow rate setting value decreases or, regardless of the flow rate setting value, the function in said stable period returns constant.

2. The mass flow controller according to claim 1, further comprising:
a flow rate output section that performs a calculation on said flow rate measurement value and outputs a flow rate indicative signal,
wherein the flow rate output section performs a first calculation on the flow rate measurement value in the changing period and a second calculation on the flow rate measurement value in the stable period.

3. The mass flow controller according to claim 2, wherein said flow rate output section smoothes said flow rate measurement value with respect to time and outputs a smoothed flow rate measurement value in the stable period, and outputs a non-smoothed flow rate measurement value without processing in the changing period.

4. The mass flow controller according to claim 1, wherein said changing period is substantially constant.

5. The mass flow controller according to claim 1, wherein said changing period is set to terminate when the deviation of the flow rate measurement value from the flow rate setting value decreases to within a range.

6. The mass flow controller according to claim 1, wherein the function used in said changing period varies with respect to time.

7. The mass flow controller of claim 1, wherein no pressure regulator is provided in said mass flow controller.

8. The mass flow controller of claim 1, wherein said function during said changing period comprises:
$f_1(S)=(100+K_1)/(K_1+S)$, wherein S is the flow rate setting value in percentage form, and $K_1$ is an adjustment factor.

9. The mass flow controller of claim 1, wherein said function during said stable period comprises:
$f_2(S)=S \cdot K_2+D$, wherein $K_2$ is an adjustment factor, and D is an offset constant.

10. A method of operating a mass flow controller, the method comprising:
providing the mass flow controller according to claim 1;
constantly measuring the fluid flow rate;
if a change in said flow rate setting value exceeds an amount, determining said changing period starting from said time when said change exceeds said amount, said changing period having a determined time length;

if said change does not exceed said amount, determining said stable period comprising said remaining time other than said changing period;

calculating said deviation between said measured flow rate and said flow rate setting value;

calculating said feedback control value to be supplied to said flow rate control valve based on said deviation, wherein said flow rate setting value is substituted into a first function as said gain value in said proportional calculation during in changing period, and said flow rate setting value is substituted into a second function as a gain value in said proportional calculation in said stable period; and generating said opening control signal based on said feedback control value and outputting said opening control signal to said control valve.

11. The method of claim 10, wherein the first function returns a greater value as the flow rate setting value decreases, and the second function returns a smaller value as the flow rate setting value decreases.

12. The method of claim 10, further comprising smoothing said flow rate measurement value with respect to time and outputting a smoothed flow rate measurement value in the stable period, and outputting a non-smoothed flow rate measurement value in the changing period.

13. The method of claim 12, wherein said smoothing is performed according to
OUT=(OUT−OUT_OLD)·Z+OUT_OLD, wherein OUT on the left-hand side is a more recently calculated latest flow rate indicative value, reference character OUT on the right-hand side is a sampled flow rate measurement value, and reference character OUT_OLD is a previously calculated flow rate indicative value.

14. The method of claim 10, wherein said changing period is substantially constant.

15. The method of claim 10, further comprising terminating said changing period when the deviation decreases to within a range.

16. The method of claim 10, wherein the first function varies with respect to time.

17. The method of claim 10, wherein said first function comprises:
$f_1(S)=(100+K_1)/(K_1+S)$, wherein S is the flow rate setting value in percentage form, and $K_1$ is an adjustment factor.

18. The method of claim 10, wherein said second function comprises:
$f_2(S)=S \cdot K_2+D$, wherein $K_2$ is an adjustment factor, and D is an offset constant.

19. The method of claim 10, wherein no pressure measurement is performed in said mass flow controller.

20. The mass flow controller according to claim 1, wherein the function in said changing period is obtained using Formula (1), and the function in said stable period is obtained using Formula (2) wherein:

$$F1(s)=(100+K)/(K1+S) \quad \text{Formula (1)}$$

$$F2(s)=S \cdot K2+D. \quad \text{Formula (2)}$$

21. A mass flow controller, comprising:

a flow rate sensor section that measures a flow rate of a fluid flowing through a flow channel and outputs a flow rate measurement signal indicating a flow rate measurement value;

a flow rate control valve disposed one of upstream and downstream of the flow rate sensor section;

a calculation means for performing at least a proportional calculation on a deviation of the flow rate measurement value from a target flow rate setting value, to calculate a feedback control value to be supplied to an opening control signal output means; and the opening control signal output means for generating an opening control signal based on said feedback control value, and outputting the opening control signal to the flow rate control valve, the calculation means uses a gain value obtained by substituting said flow rate setting value into a function, and multiplies said gain value by the deviation in said proportional calculation, said function differs between a changing period that comprises a period from a point in time when said flow rate setting value changes by at least an amount, and a stable period that comprises a period other than the changing period;

the function in said changing period returns a greater value as the flow rate setting value decreases, and the function in said stable period returns a smaller value as the flow rate setting value decreases or, regardless of the flow rate setting value, the function in said stable period returns constant.

\* \* \* \* \*